Oct. 22, 1929.  H. I. DANZIGER  1,732,224
WIRE CUTTING DEVICE
Filed March 12, 1928  2 Sheets-Sheet 1
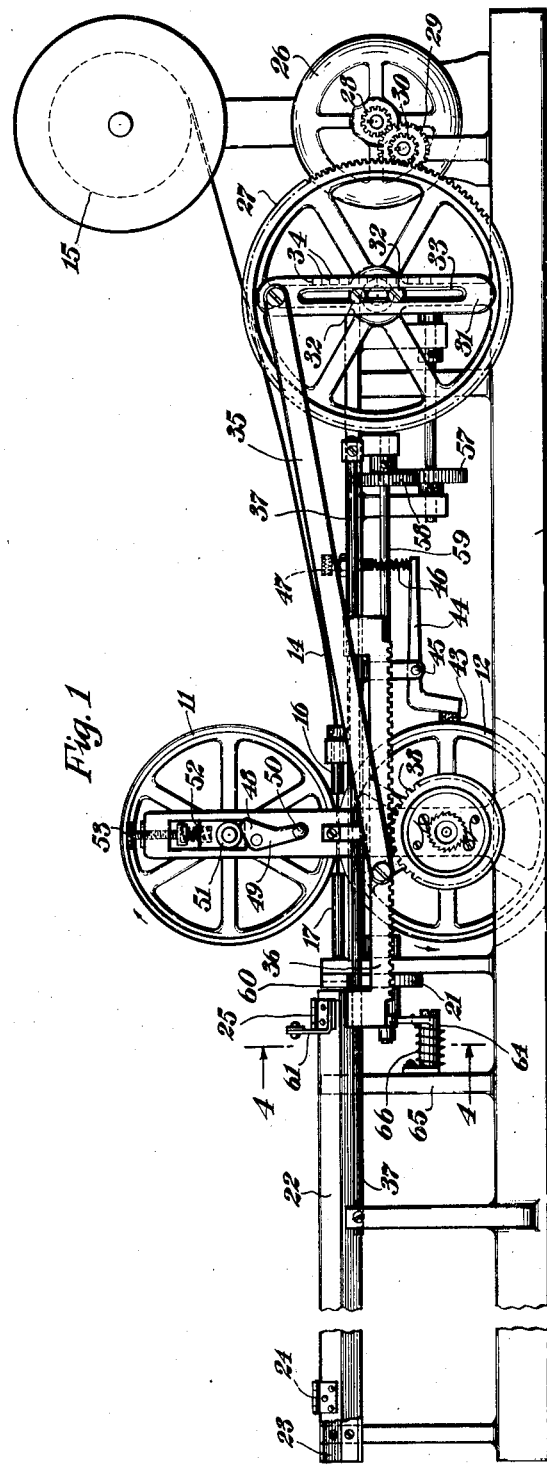
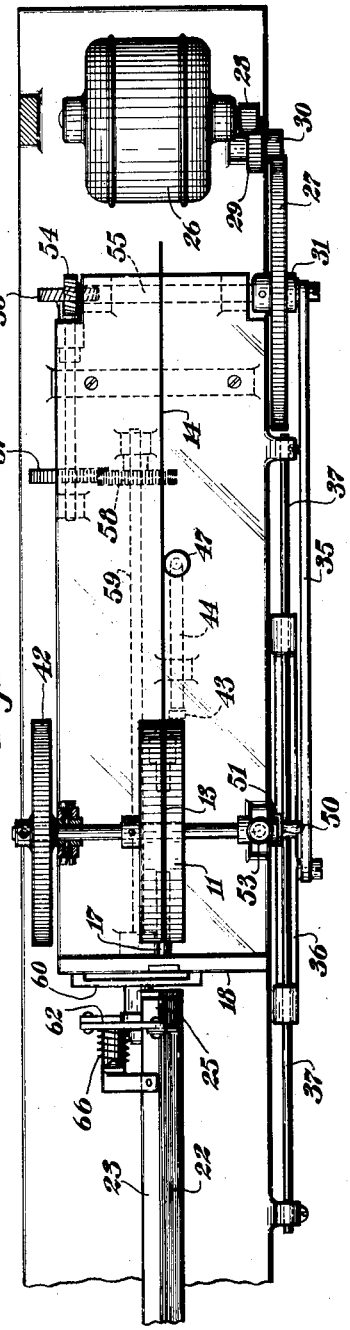
INVENTOR
*Harold I. Danziger,*
BY
*Frederick Breitenfeld*
ATTORNEY

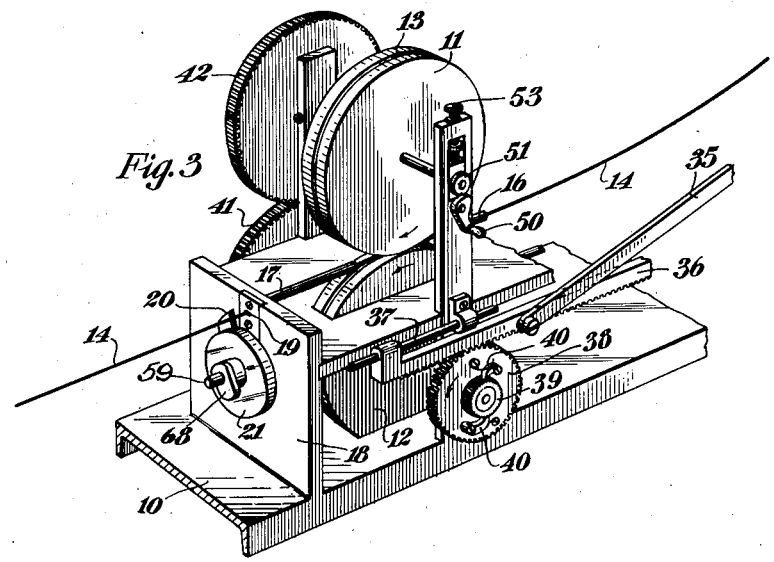
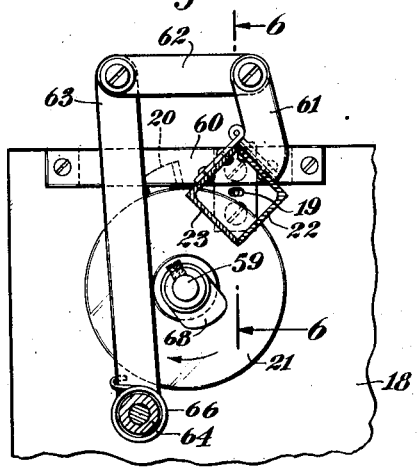
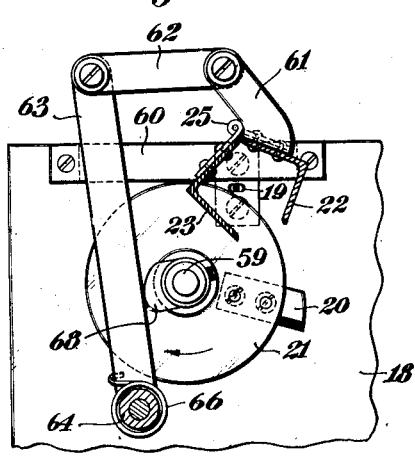
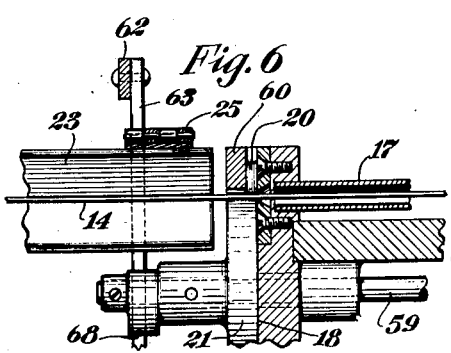
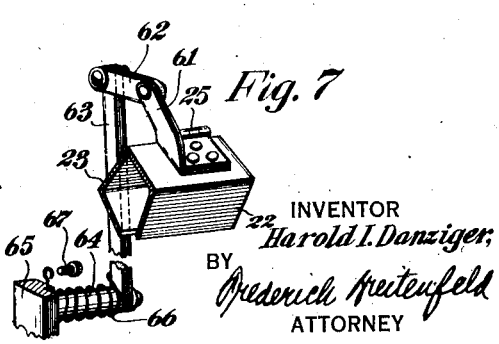

Patented Oct. 22, 1929

1,732,224

UNITED STATES PATENT OFFICE

HAROLD I. DANZIGER, OF NEW YORK, N. Y., ASSIGNOR TO CONDENSER CORPORATION OF AMERICA, OF NEW YORK, N. Y., A CORPORATION OF NEW YORK

WIRE-CUTTING DEVICE

Application filed March 12, 1928. Serial No. 260,840.

My present invention relates generally to cutting machines, and has particular reference to a device for automatically cutting successive lengths from a reel of wire or the like.

It is a primary object of my invention to provide a device which is extremely simple in structural nature and hence inexpensive from a manufacturing and assembling standpoint; one which is so constructed as to occupy a minimum amount of space; one which is extremely efficient and uniform in its operation, and wherein means are provided for making a number of desirable adjustments, depending upon the speed of operation, type of wire, length of wire, elements desired, etc.

It is a feature of my invention to provide a device of the foregoing character wherein a minimum number of working parts cooperate to attain a maximum of smooth and efficient operation. Briefly, my invention contemplates the provision of a pair of tangentially arranged driving wheels intermittently operated to feed successive lengths of a continuous wire element along said tangential line; the provision of a wire guide adjacent to the wheels and having a bore arranged along said tangent through which said wire is made to pass; the provision of a shearing surface substantially perpendicular to said tangential line, from which surface successive lengths of the wire to be cut are intermittently fed in a substantially perpendicular direction; the provision of an efficient cutting instrumentality cooperating with said shearing surface to cut the successively presented lengths of wire in an efficient manner; the provision of a wire-receiving chamber axially aligned with said tangential line and adapted to receive the wire as it is presented to the cutting instrumentality; and means for automatically operating said wire-receiving chamber to discharge the cut lengths of wire successively.

One feature of my invention lies in providing the cutting instrumentality in the form of a constantly rotating disc which is provided with a cutter or blade traveling in a closed path over said shearing surface, the path of travel passing over the point at which the wire lengths are successively projected from said surface.

Another feature of my invention lies in providing the wire-receiving chamber in the relatively simple form of two mutually hinged complementary members; and in providing means associated with said cutting disc for automatically opening said chamber, by a relatively pivotal movement of said hinged members, at predetermined times so as to discharge the cut lengths of wire.

Another feature of my invention lies in providing extremely simple operating means for intermittently rotating the tangentially arranged wheels; more particularly, in providing a reciprocating rack and gear arrangement, associated with a ratchet and pawl system, whereby the entire arrangement is extremely simple in structural and operative nature.

Other features lie in the provision of means for controlling the length of stroke of the rack and gear arrangement, in providing efficient yet simple brake means for the feeding rollers, in providing simple yet efficient means for momentarily separating the feeding rollers to permit initial threading of the wire therebetween; and in general, in the construction and arrangement of parts which achieve a compactness and simplicity which is highly desirable and advantageous.

For the attainment of the foregoing objects and such other objects as may hereinafter appear or be pointed out, I have constructed a device embodying the features of my invention and illustrated in the accompanying drawings wherein—

Figure 1 is an elevational view of my complete device;

Figure 2 is a plan view of the major portion thereof;

Figure 3 is a fragmentary perspective view showing the extreme simplicity of certain major portions thereof;

Figure 4 is a cross-sectional view taken substantially along the line 4—4 of Figure 1;

Figure 5 is a view similar to Figure 4 showing the parts in relatively different positions during a succeeding portion of the operation;

Figure 6 is a fragmentary cross-sectional view upon an enlarged scale taken substantially along the line 6—6 of Figure 4; and Figure 7 is a fragmentary perspective view of a portion of the wire-receiving chamber.

My entire device is preferably mounted upon a table or base 10 provided with suitable stanchions and columns whose detailed arrangement need not be described. A pair of driving wheels 11 and 12 are arranged in tangential relationship, each of the wheels being preferably circumferentially grooved as at 13 so that at the common tangent a suitable passageway is provided through which a continuous length of wire 14 may be made to pass. The wire 14 leads from a reel 15 and is directed into frictional interposition along the common tangent between the wheels 11 and 12 by means of a guiding sleeve 16. On the further side of the wheels 11 and 12 I provide a wire guide 17, also in the nature of a sleeve or tube, through which the wire is fed along said tangential line.

The wire guide 17 terminates at its outer end in a shearing surface or shearing plate 18 substantially perpendicular to the tangential line referred to, successive lengths of the wire 14 being projected out of a bore 19 in the shearing plate 18 in an intermittent manner.

Traveling over the shearing surface 18 is a blade or cutter 20 mounted upon a constantly rotating disc 21, the latter being mounted upon a shaft 59 substantially parallel to the tangential line referred to, yet somewhat offset with respect thereto. The disc 21 is so mounted that the cutter 20 will travel in a continuous closed path over the shearing surface 18, the path passing over the bore 19 through which the wire lengths are successively projected.

Axially aligned with the wire 14 as it projects from the bore 19 is a wire-receiving chamber which comprises two mutually hinged angular members 22 and 23. The member 23 is held stationary and the member 22 is hinged thereto along the uppermost edge as at 24 and 25. The wire-receiving chamber constituted of these complementary hinged members 22 and 23 is normally closed as shown in Figure 4, but at predetermined times it automatically opens as shown in Figure 5, thereby permitting any cut length of wire therein to drop out into a suitable receptacle.

The particular means and mechanism which I employ for causing these several parts of my device to function efficiently, comprise the simple expedients of a rack and gear arrangement for driving the wheels 11 and 12, a gear chain for driving the cutting disc 21, and a cam arrangement for automatically operating the wire-receiving chamber.

Referring more particularly to Figure 1, a motor 26 drives a relatively large gear 27 through the intermediary of gears 28, 29, and 30. An adjustable crank is mounted upon the outer face of the gear 27 and comprises a slotted member 31 adjustably attached to the hub of the gear 27 by studs 32 extending through the slot 33. A scale 34, or similar set of indicating marks, is preferably provided along one edge of the member 31 so that an adjustment thereof may be expeditiously made in terms of length of wire desired. Obviously, an adjustment of the member 31 with respect to the hub of the gear 27 will alter its effective crank arm.

At one end of the member 31 is pivoted a pitman 35, the latter being in turn pivoted to a horizontally arranged rack 36 mounted for reciprocal movement upon a suitable guide 37. A constant rotation of the gear 27 results in a continuous movement of the rack 36 and the stroke of this movement is controlled by the adjustment of the member 31.

The rack 36 meshes with a gear 38 coaxially mounted with respect to the feeding roller 12. The gear 38 rotates continuously in successively opposite directions, but it is effective in moving the feeding roller 12 only during its intermittent movement in one of said directions. This is achived through the intermediary of the ratchet and pawl arrangement illustrated most clearly in Figures 1 and 3. A ratchet wheel 39 is fixed to the shaft of the roller 12, and a pair of pawls 40 are fixed to the gear 38. On the forward stroke of the rack 36, i. e., on the stroke toward the left in Figure 1, the pawls 40 act upon the wheel 39 to rotate the feeding roller 12 through a predetermined angle. On the return stroke of the rack 36, the pawls 40 ride over the teeth of the ratchet wheel 39, and the feeding roller 12 remains stationary.

Mounted upon the shaft of the roller 12, and on the opposite side of the device, is a relatively large gear 41 which meshes with a similar gear 42 of the same size, the latter being mounted upon the shaft of the feeding roller 11. The inter-meshing of the gears 41 and 42 effects a simultaneous angular motion of the rollers 11 and 12 in the direction of the arrows of Figure 1 as the rack 36 moves through its forward stroke. During this intermittent movement of the rollers 11 and 12, a predetermined length of the wire 14 is drawn from the reel 15 and forced through the wire guide 17 and thence out of the bore 19 into a position in the path of the cutter 20 as shown in Figure 3.

A brake 43 mounted upon a lever 44 is in constant contact with the roller 12 to prevent movement of this roller, and hence of both rollers, during such times as the rack 36 is not positively driving the gear 38 in the advance direction. The lever 44 is medially pivoted at 45, and a spring 46, whose tension is adjustable by means of a knurled knob 47, exerts a predetermined pressure upon the rear end of the lever 44 to hold the brake 43 in a yieldable manner and with predetermined force against the surface of the roller 12.

For initially feeding the wire 14 between the rollers 11 and 12, the roller 11 is momentarily adjustable out of its normal position, this adjustment being effected by means of a cam 48 provided on one end of a lever 49, the opposite end being provided with a handle 50. The cam 48 acts upon a roller or follower 51 mounted upon the shaft of the roller 11. The roller 51 is retained in normal position by means of a spring 52 whose tension is controllable by means of a knurled knob 53.

The cutting disc 21 is constantly rotated at a predetermined relative speed with respect to the movements of the rollers 11 and 12 through the intermediary of a gear 54 mounted upon the shaft 55 of the gear 27, a gear 56 meshing with the gear 54 at right angles with respect thereto, a gear 57 mounted upon the same shaft as the gear 56, and a gear 58 mounted upon the shaft 59 of the disc 21.

A protective guide 60 is mounted upon the shearing plate 18 (see Figures 1 and 2) adjacent to the top edge thereof. The cutter 20 travels underneath this guide 60 during that portion of its movement which brings it adjacent to the top of the plate 18 and hence adjacent the point of cutting. In Figure 4, the cutter 20 is shown advancing the bore 19 through which a length of wire is projecting. It will be noted that the cutter 20 is passing beneath the protective guide 60. One of the principal functions of the guide 60 is to keep the cutter 20 closely against the shearing plate 18 just prior to and during the cutting operation, thereby assuring a constant efficient operation of the cutter 20.

The movable member 22 of the wire-receiving chamber is provided with an upwardly extending arm 61 pivoted at its outer end to a link 62 which is in turn pivoted to a lever 63. The latter extends downwardly and merges into a sleeve 64. The latter is mounted for free rotative movement about a small stub shaft or spindle projecting from the stanchion 65. A spring 66 encircles the sleeve 64, has one end thereof fixed to the stanchion 65 as by means of a stud 67, and has the other end caught about the lower end of the lever 63. The spring 66 tends to hold the lever 63 normally in the position of Figure 4, this serving to hold the wire-receiving chamber closed as shown in this figure. At predetermined regular intervals, the lever 63 is swung against the action of the spring 66 as shown in Figure 5, thereby opening the wire-receiving chamber and permitting any cut length of wire therein to drop out. The recurring swinging of the lever 63 from the position of Figure 4 to the position of Figure 5 is effected by means of a cam 68 mounted upon the shaft 59 of the disc 21.

From the foregoing description, the smooth and efficient operation of the device will be clearly understood. Once the wire has been threaded through the sleeve 16 between the rollers 11 and 12 and through the wire guide 17, and once the member 31 has been set to predetermined adjustment, it is only necessary to start the motor 26, and the wire 14 will be rapidly and efficiently cut in an automatic manner into predetermined lengths. These lengths will drop successively from the wire-receiving chamber at the left of Figure 1, and may be collected in a suitable receptacle or in any other desired manner. The wire-receiving chamber serves not only to prevent undue curving of the wire as it is fed out of the bore 19, but it serves also to prevent the action of the cutter upon the wire to throw the cut length haphazardly in one direction or another.

It will be noted that the device as a whole is extremely simple both in structural nature and operation. For this reason, its manufacture is inexpensive, there is little likelihood for defective operation to set in, the device is extremely flexible from the standpoint of varying requirements, it occupies a minimum amount of space, and once started it requires absolutely no attention.

It will of course be obvious that changes in the details herein described and illustrated for the purpose of explaining the nature of my invention may be made by those skilled in the art without departing from the spirit and scope of the invention as expressed in the appended claims. It is therefore intended that these details be interpreted as illustrative, and not in a limiting sense.

Having thus described my invention and illustrated its use, what I claim as new and desire to secure by Letters Patent is—

1. In a wire cutting device, a shearing plate having a wire-guiding bore, means for intermittently feeding a predetermined length of wire through and out of said bore, a constantly traveling cutter arranged to pass over the bore end and shear off the wire projecting therefrom during each interim between feeding operations, a wire-receiving chamber comprising complementary hinged members and axially aligned with said bore for receiving the projecting and eventually cut wire length, means for pivoting said members at predetermined times to discharge the cut length, and spring means for returning said members to closed normal relationship after the discharge of said length.

2. In a wire cutting device, a shearing plate having a wire-guiding bore substantially perpendicular thereto, means for intermittently feeding a predetermined length of wire through and out of said bore, a constantly rotating cutting disc provided with a cutter and so mounted that the cutter will pass over the bore end at successive intervals between feeding operations, a wire-receiving chamber comprising complementary hinged members and axially aligned with said bore for receiving the projecting and eventually cut wire, and cam means associated with said disc for pivoting said members at predetermined times to open the chamber and permit the cut wire length to drop out.

3. In a wire cutting device, a pair of tangentially arranged driving wheels adapted to grasp a wire therebetween, a constantly traveling cutter arranged to cross said tangential line at regular intervals, and means for intermittently operating said wheels to feed successive wire lengths along said line and into the path of the cutter, said means being arranged to halt the wire feed during those intervals at which the cutter crosses said line, and said means comprising a reciprocating rack, a gear oscillated thereby, and a pawl and ratchet arrangement operatively interposed between said gear and said wheels.

4. In a wire cutting device, a pair of tangentially arranged driving wheels adapted to grasp a wire therebetween, a constantly traveling cutter arranged to cross said tangential line at regular intervals, a driving source, a rack reciprocated by the latter, a gear oscillated by said rack, a pawl and ratchet arrangement operatively interposed between said gear and wheels to operate the latter intermittently and thereby feed successive wire lengths to said cutter, and means for regulating the stroke of said rack.

5. In a wire cutting device, a pair of tangentially arranged driving wheels adapted to grasp a wire therebetween, a driving source, a rack reciprocated by the latter, a gear oscillated by said rack, a pawl and ratchet arrangement operatively interposed between said gear and wheels to operate the latter intermittently and thereby feed successive wire lengths along said tangential line, and a constantly rotating cutter operated by said source and arranged to cross said tangential line and shear off the wire during the inoperative stroke of the ratchet.

6. In a wire cutting device, a pair of tangentially arranged driving wheels adapted to grasp a continuous wire therebetween, a wire guide adjacent to the wheels and having a bore arranged along said tangent, said guide being arranged with its outer face perpendicular to said tangent and constituting a shearing surface, means for intermittently rotating said wheels to feed successive lengths of wire through said bore and perpendicularly out of said face, and cutting means operable in timed relation to the wheels for shearing the wire adjacent to the outer end of said bore during the interims between the feeding operations.

7. In a wire cutting device, a pair of tangentially arranged driving wheels adapted to grasp a continuous wire therebetween, a wire guide adjacent to the wheels and having a bore arranged along said tangent, said guide being arranged with its outer face perpendicular to said tangent and constituting a shearing surface, means for intermittently rotating said wheels to feed successive lengths of wire through said bore and perpendicularly out of said face, and cutting means operable in timed relation to the wheels for shearing the wire adjacent to the outer end of said bore during the interims between the feeding operations, said cutting means comprising a constantly rotating disc having an axis parallel but offset with respect to said bore, and a cutter peripherally carried by said disc and arranged so that its path of travel crosses the outer end of said bore.

In witness whereof, I have signed this specification this 24th day of February, 1928.

HAROLD I. DANZIGER.